(12) United States Patent
Li et al.

(10) Patent No.: US 11,561,124 B2
(45) Date of Patent: Jan. 24, 2023

(54) METHOD AND APPARATUS FOR DYNAMICALLY ACQUIRING LOAD OF VEHICLE, AND STORAGE MEDIUM

(71) Applicant: CITIC Dicastal CO., LTD., Hebei (CN)

(72) Inventors: Xi Li, Qinhuangdao (CN); Zhihua Zhu, Qinhuangdao (CN); Shiwen Xu, Qinhuangdao (CN); Yao Dai, Qinhuangdao (CN); Shaobing Huang, Qinhuangdao (CN); Hongwei Sheng, Qinhuangdao (CN); Xiaoqiang Li, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 433 days.

(21) Appl. No.: 16/790,976

(22) Filed: Feb. 14, 2020

(65) Prior Publication Data
US 2021/0102835 A1 Apr. 8, 2021

(30) Foreign Application Priority Data
Oct. 8, 2019 (CN) .......................... 201910951485.5

(51) Int. Cl.
*G01G 19/08* (2006.01)

(52) U.S. Cl.
CPC .................................. *G01G 19/08* (2013.01)

(58) Field of Classification Search
CPC ....... G01G 19/08; G01G 19/12; G01L 5/0019
See application file for complete search history.

(56) References Cited

U.S. PATENT DOCUMENTS

| | | | | |
|---|---|---|---|---|
| 5,585,604 A | * | 12/1996 | Holm | G01G 19/035 177/133 |
| 9,068,878 B2 | * | 6/2015 | Cash | G01L 5/1627 |
| 2008/0271541 A1 | * | 11/2008 | Neuman | G01G 19/12 73/767 |
| 2014/0190753 A1 | * | 7/2014 | Mian | G01G 23/002 177/136 |
| 2019/0339110 A1 | * | 11/2019 | Kaseda | G01G 19/022 |

* cited by examiner

*Primary Examiner* — Randy W Gibson
(74) *Attorney, Agent, or Firm* — Cooper Legal Group, LLC (57) ABSTRACT

A method, apparatus and device for dynamically acquiring the load of a vehicle, and a storage medium are disclosed. The method includes: acquiring deformation data of load-bearing deformation of a wheel hub of the vehicle, and acquiring the load of the vehicle according to the deformation data.

6 Claims, 7 Drawing Sheets

METHOD AND APPARATUS FOR DYNAMICALLY ACQUIRING LOAD OF VEHICLE, AND STORAGE MEDIUM

CROSS-REFERENCE TO RELATED APPLICATIONS

The present application claims benefit of Chinese Patent Application No. 201910951485. 5, filed on Oct. 8, 2019, the contents of which are hereby incorporated by reference in their entirety.

BACKGROUND

With the development of economy and the advancement of science and technology, intelligent transportation has become an important development direction of human life. How to dynamically acquire load information of vehicles is an important part of the intelligent transportation.

At present, the methods used to acquire the load of vehicles are very limited, basically based on floor scales. The floor scales have great limitations. The first limitation is: the cost of the floor scales and the construction cost are relatively high. The second limitation is: the load of the vehicles cannot be acquired dynamically anytime anywhere.

SUMMARY

The present disclosure relates to the technical field of vehicle manufacturing, and more particularly relates to a method, apparatus and device for dynamically acquiring the load of a vehicle, and a storage medium.

In view of this, the embodiments of the present disclosure are expected to provide a method, apparatus and device for measuring the load of a vehicle, and a storage medium, which can quickly and dynamically acquire the load of the vehicle and are low in cost.

In order to achieve the above objective, in a first aspect, the embodiment of the present disclosure provides a method for dynamically acquiring the load of a vehicle. The method includes:

acquiring deformation data of load-bearing deformation of a wheel hub of the vehicle; and acquiring the load of the vehicle according to the deformation data.

In the above solution, the step of acquiring the load of the vehicle according to the deformation data includes:

acquiring the motion state of the vehicle; and calculating the deformation data according to the corresponding motion state of the vehicle to acquire the load of the vehicle.

In the above solution, the step of acquiring the motion state of the vehicle includes:

acquiring an angle change value of the wheel hub of the vehicle within preset time; and acquiring the motion state of the vehicle according to the angle change value.

In the above solution, the step of acquiring the motion state of the vehicle according to the angle change value includes:

determining that the motion state of the vehicle is static if the angle change value is less than a preset value, otherwise determining that the motion state of the vehicle is running.

In the above solution, the step of acquiring the deformation data of the load-bearing deformation of the wheel hub of the vehicle includes:

acquiring a plurality of pieces of deformation data at a preset frequency within the preset time; and filtering out interference data in the plurality of pieces of deformation data to acquire effective deformation data.

In the above solution, the step of calculating the deformation data according to the corresponding motion state of the vehicle to acquire the load of the vehicle includes:

calculating a mean value of the effective deformation data when the motion state of the vehicle is static, and acquiring the load of the vehicle according to the mean value of the effective deformation data;

otherwise, calculating a true effective value of the effective deformation data through Fourier transformation, and acquiring the load of the vehicle according to the true effective value of the effective deformation data.

In a second aspect, the embodiment of the present disclosure provides an apparatus for dynamically acquiring the load of a vehicle. The apparatus includes a memory, a communication bus and a processor, in which the memory is configured to store programs of a method for dynamically acquiring the load of a vehicle, and acquired deformation data;

the communication bus is configured to realize connection and communication between the memory and the processor; and the processor is configured to execute programs of a method for dynamically acquiring the load of the vehicle, which is stored in the memory, so as to:

acquire deformation data of load-bearing deformation of a wheel hub of the vehicle, and acquire the load of the vehicle according to the deformation data.

In a third aspect, the embodiment of the present disclosure provides a device for dynamically acquiring the load of a vehicle. The device includes an acquisition unit configured to acquire deformation data of load-bearing deformation of a wheel hub of the vehicle, and a processing unit configured to process the deformation data and acquire the load of the vehicle. The acquisition unit is connected with the processing unit.

In a fourth aspect, the embodiment of the present disclosure provides an on-board computer. The on-board computer includes: a memory, a communication bus and a processor.

The memory is configured to store programs of a method for dynamically acquiring the load of a vehicle, and acquired deformation data.

The communication bus is configured to realize connection and communication between the memory and the processor.

The processor is configured to execute the programs of the method for dynamically acquiring the load of the vehicle, which is stored in the memory, so as to implement the steps of any one of the above methods.

In a fifth aspect, the embodiment of the present disclosure provides a computer readable storage medium. The computer readable storage medium stores an executable program. The executable program is executed by a processor to implement the steps of any one of the above methods.

The method, apparatus and device for dynamically acquiring the load of the vehicle, and the storage medium in the embodiments of the present disclosure include acquiring the deformation data of the load-bearing deformation of the wheel hub of the vehicle, and acquiring the load of the vehicle according to the deformation data. It can be seen that according to the method, apparatus and device for dynamically acquiring the load of the vehicle, and the storage medium in the embodiments of the present disclosure, the load of the vehicle is acquired according to the deformation of the wheel hub of the vehicle in the load-bearing process and through certain calculation. The load of the vehicle can be quickly and dynamically acquired, and the cost is low.

Other beneficial effects of the embodiments of the present disclosure will be further described in conjunction with specific technical solutions in the specific implementations.

DETAILED DESCRIPTION

The embodiment of the present disclosure provides a method for dynamically acquiring the load of a vehicle. The method includes that: deformation data of load-bearing deformation of a wheel hub of the vehicle is acquired; and the load of the vehicle is acquired according to the deformation data.

According to the method, apparatus and device for dynamically acquiring the load of the vehicle, and the storage medium of the present disclosure, the load of the vehicle is acquired according to the deformation of the wheel hub of the vehicle in the load-bearing process and through certain calculation. The load of the vehicle can be quickly and dynamically acquired, and the cost is low.

The embodiment of the present disclosure further provides an apparatus for dynamically acquiring the load of a vehicle. The apparatus includes a first acquisition assembly and a second acquisition assembly. The first acquisition assembly is configured to acquire deformation data of load-bearing deformation of a wheel hub of the vehicle. The second acquisition assembly is configured to acquire the load of the vehicle according to the deformation data.

The embodiment of the present disclosure further provides a device for dynamically acquiring the load of a vehicle. The device includes an acquisition unit configured to acquire deformation data of load-bearing deformation of a wheel hub of the vehicle, and a processing unit configured to process the deformation data and acquire the load of the vehicle. The acquisition unit is connected with the processing unit.

The embodiment of the present disclosure further provides an on-board computer. The on-board computer includes: a memory, a communication bus and a processor.

The memory is configured to store programs of a method for dynamically acquiring the load of a vehicle, and acquired deformation data.

The communication bus is configured to realize connection and communication between the memory and the processor.

The processor is configured to execute the programs of the method for dynamically acquiring the load of the vehicle, which is stored in the memory, so as to implement the steps of any one of the above methods.

The embodiment of the present disclosure provides a computer readable storage medium. The computer readable storage medium stores an executable program. The executable program is executed by a processor to implement the steps of any one of the above methods.

The present disclosure is further described in detail below in combination with the drawings and specific embodiments. It should be understood that the specific embodiments described here are merely to illustrate and explain the present disclosure, and not intended to limit the present disclosure.

First Embodiment

Figure 1:
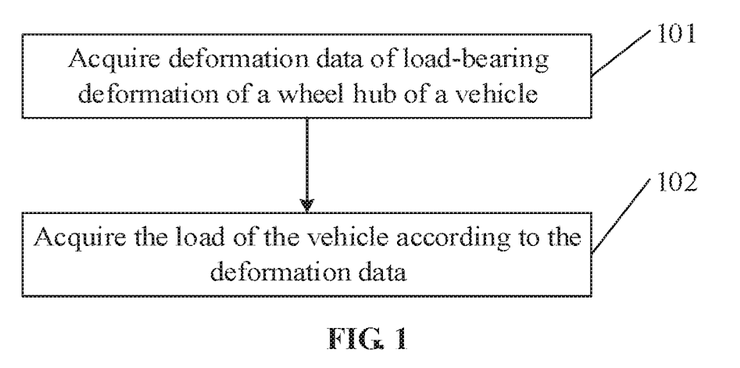
FIG. 1 is a schematic flow diagram of a method for dynamically acquiring the load of a vehicle according to the embodiment of the present disclosure.

The present embodiment provides a method for dynamically acquiring the load of a vehicle. The method may be implemented by an on-board computer, or may be implemented by an independently mounted computer. As shown in FIG. 1, the method includes that:

Step 101: deformation data of load-bearing deformation of a wheel hub of the vehicle is acquired.

The wheel hub of the vehicle would have a slight deformation when loaded. The slight deformation may be detected by a deformation sensor. That is, the deformation data may be acquired by the deformation sensor.

In one implementation mode, the step that the deformation data of the load-bearing deformation of the wheel hub of the vehicle is acquired includes that:

a plurality of pieces of deformation data are acquired at a preset frequency within the preset time; and interference data in the plurality of pieces of deformation data is filtered out to acquire effective deformation data.

Specifically, the preset frequency is 10 ms, and the preset time is based on acquisition of 200 pieces of data. The data is acquired by the deformation sensor. The interference data is filtered out by a digital filter, so as to filter out some power-frequency or high-frequency interference data.

Step 102: the load of the vehicle is acquired according to the deformation data.

The wheel hub of the vehicle would have the slight deformation when loaded, and this deformation and load on the wheel hub have a certain correspondence relation, so that the load of the wheel hub of the vehicle, i.e., the load of the vehicle, can be calculated according to the detected slight deformation of the wheel hub.

Specifically, during the actual detection, the deformation of the wheel hub of the vehicle and the load of the vehicle may be in a positive-going linear relation.

In one implementation mode, the step that the load of the vehicle is acquired according to the deformation data includes that:

the motion state of the vehicle is acquired; and the deformation data is calculated according to the corresponding motion state of the vehicle to acquire the load of the vehicle.

Due to different motion states of vehicles, calculation methods of the load of vehicles are different, so that the motion state of the vehicle needs to be determined at first.

In one implementation mode, the step that the motion state of the vehicle is acquired includes that:

an angle change value of the wheel hub of the vehicle is acquired within preset time; and the motion state of the vehicle is acquired according to the angle change value.

The angle change value of the wheel hub of the vehicle here is detected by an angle sensor, and indicates the rotation of the wheel hub of the vehicle, so that the motion state of the vehicle may be acquired according to the angle change value of the wheel hub of the vehicle. The preset time here may be generally 10 seconds according to specific vehicle settings.

In one implementation mode, the step that the motion state of the vehicle is acquired according to the angle change value includes that:

if the angle change value is less than a preset value, it is determined that the motion state of the vehicle is static, otherwise it is determined that the motion state of the vehicle is running Since the vehicle may possibly vibrate in an idling state or other static states, one preset value needs to be set to determine whether the vehicle is static. The preset value is generally greater than zero and around zero, and is specifically determined according to the type of the vehicle.

In one implementation mode, the step that the deformation data is calculated according to the corresponding motion state of the vehicle to acquire the load of the vehicle includes that:

when the motion state of the vehicle is static, a mean value of the effective deformation data is calculated, and the load of the vehicle is acquired according to the mean value of the effective deformation data;

otherwise, a true effective value of the effective deformation data is calculated through Fourier transformation, and the load of the vehicle is acquired according to the true effective value of the effective deformation data.

Since the effective deformation data of the wheel hub of the vehicle has a relatively small fluctuation when the vehicle is static, the mean value is directly calculated. On the contrary, the effective deformation data of the wheel hub of the vehicle has a relatively large fluctuation when the vehicle is running, the true effective value of the effective deformation data is calculated through the Fourier transformation to acquire the accurate load of the vehicle.

The acquisition frequency of the Fourier transformation is determined based on an actual vehicle speed (and the speed of periodic rotation of the wheel hub). Therefore, real-time angle information of the wheel hub of the vehicle needs to be acquired before the Fourier transformation, so that a periodic frequency that the wheel hub rotates for one circle is captured as the frequency of the Fourier transformation.

Figure 2:
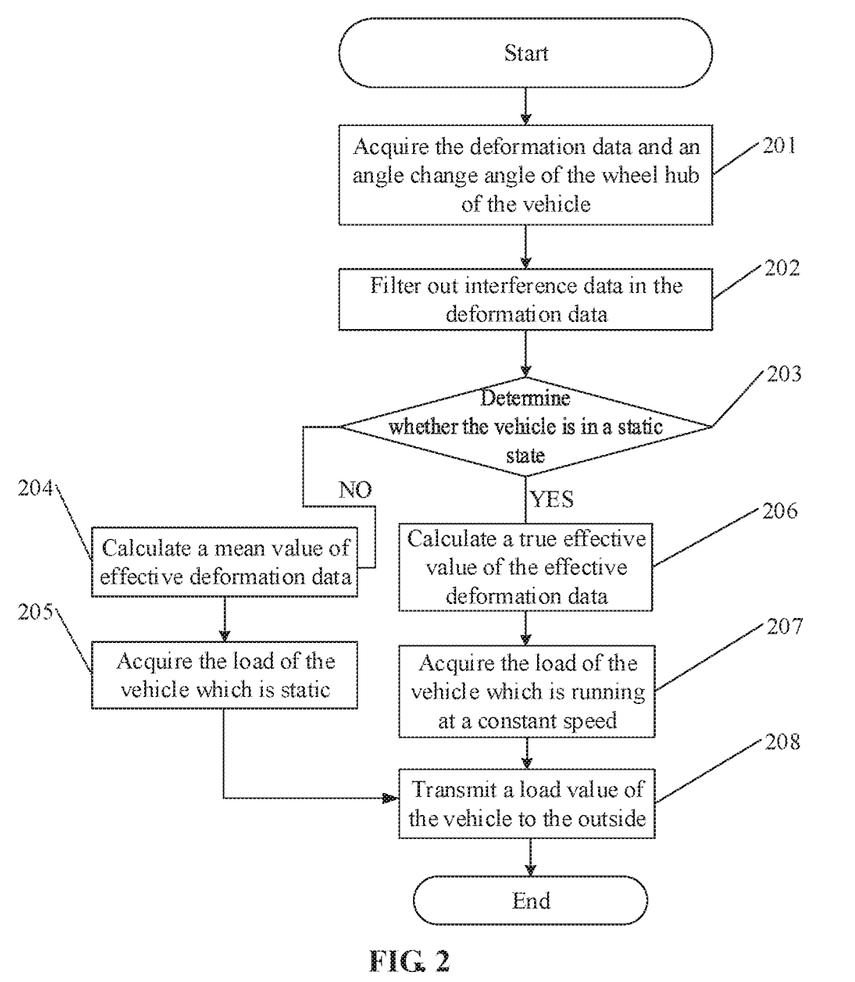
FIG. 2 is a specific schematic flow diagram of the method for dynamically acquiring the load of the vehicle according to the embodiment of the present disclosure.

Further, in order to better know the present embodiment, a specific flow of the method for dynamically acquiring the load of the vehicle of the embodiment of the present disclosure, as shown in FIG. 2, includes that:

Step 201: the deformation data and the angle change angle of the wheel hub of the vehicle are acquired.

Step 202: the interference data in the deformation data is filtered out to acquire the effective deformation data.

Step 203: whether the vehicle is in the static state is determined. Whether the vehicle is in the static state is determined according to the angle change value. If the vehicle is in the static state, the step 204 is proceeded, otherwise the step 206 is proceeded.

Step 204: the mean value of the effective deformation data is calculated.

Step 205: the load of the vehicle which is static is acquired. That is, the load of the vehicle is calculated according to the mean value of the effective deformation data and the Relation between Deformation Data and Load. The Relation between Deformation Data and Load is determined by a test on the deformation sensor during delivery. For example, in the idling state of the vehicle, initial values of the deformation data and the angle change value are acquired, and then are stored in a memory of the vehicle. Then, the preset load is gradually increased, and the deformation data is acquired at the same time. In this way, the Relation between Deformation Data and Load may be determined. The more the times of measurements is, the more accurate the data is. The preset load here is a load that is large enough to enable the wheel hub to deform.

Step 206: the true effective value of the effective deformation data is calculated. That is, the true effective value of the effective deformation data is calculated through the Fourier transformation.

Step 207: the load of the vehicle which is running at a constant speed is acquired. That is, the load of the vehicle is calculated according to the true effective value of the effective deformation data and the Relation between Deformation Data and Load. The Relation between Deformation Data and Load is the same as the above, and may be determined by a test on the deformation sensor during delivery. The determination method is the same as the above.

Step 208: the load value of the vehicle is transmitted to the outside. For example, the load value is transmitted onto a display screen of a center console of the vehicle according to a transmission principle such as radio frequency (RF), i.e., a radio signal has a frequency range between 300 kHz and 300 GHz, and is a widely applied radio communication signal.

Since the method for dynamically acquiring the load of the vehicle of the embodiment of the present disclosure mainly includes two motion states, the two motion states are separately described below.

Figure 3:
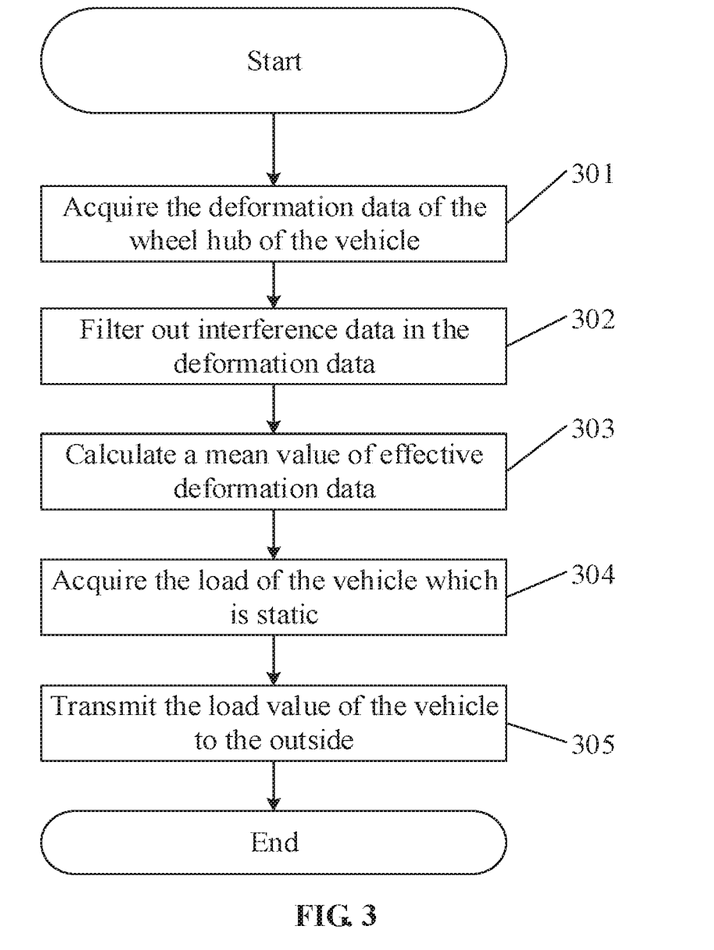
FIG. 3 is a schematic flow diagram of the method for dynamically acquiring the load of the vehicle in a static state according to the embodiment of the present disclosure.

FIG. 3 is a schematic flow diagram of the method for dynamically acquiring the load of the vehicle in a static state according to the embodiment of the present disclosure. As shown in FIG. 3, the flow includes that:

Step 301: the deformation data of the wheel hub of the vehicle is acquired.

Step 302: the interference data in the deformation data is filtered out to acquire the effective deformation data.

Step 303: the mean value of the effective deformation data is calculated.

Step 304: the load of the vehicle which is static is acquired. That is, the load of the vehicle is calculated according to the mean value of the effective deformation data and the Relation between Deformation Data and Load. The Relation between Deformation Data and Load is obtained as the above.

Step 305: the load value of the vehicle is transmitted to the outside.

Figure 4:
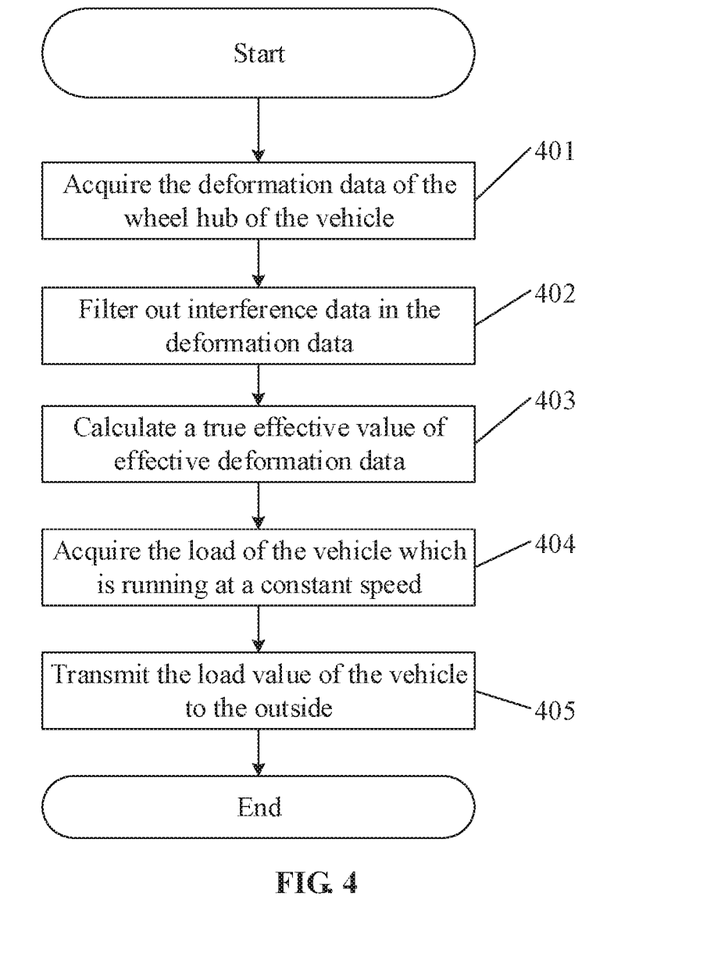
FIG. 4 is a schematic flow diagram of the method for dynamically acquiring the load of the vehicle in a constant-speed running state according to the embodiment of the present disclosure.

FIG. 4 is a schematic flow diagram of the method for dynamically acquiring the load of the vehicle in a constant-speed running state according to the embodiment of the present disclosure. As shown in FIG. 4, the flow includes that:

Step 401: the deformation data of the wheel hub of the vehicle is acquired.

Step 402: the interference data in the deformation data is filtered out to acquire the effective deformation data.

Step 403: the true effective value of the effective deformation data is calculated.

Step 404: the load of the vehicle which is running at a constant speed is acquired. That is, the load of the vehicle is calculated according to the true effective value of the effective deformation data and the Relation between Deformation Data and Load. The Relation between Deformation Data and Load is obtained as the above.

Step 405: the load value of the vehicle is transmitted to the outside.

Second Embodiment

Figure 5:
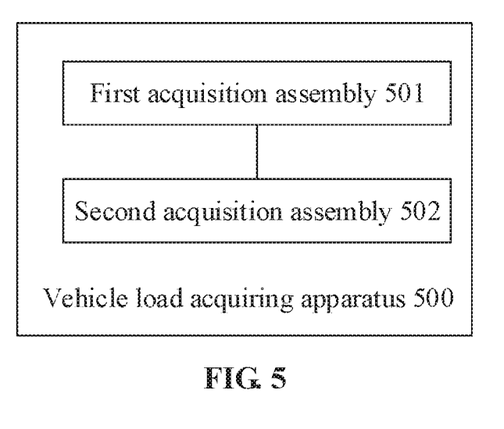
FIG. 5 is a schematic structural diagram of an apparatus for dynamically acquiring the load of a vehicle according to the embodiment of the present disclosure.

The present embodiment provides an apparatus for dynamically acquiring the load of a vehicle. As shown in FIG. 5, the apparatus 500 includes a first acquisition assembly 501 and a second acquisition assembly 502.

The first acquisition assembly 501 is configured to acquire deformation data of load-bearing deformation of a wheel hub of the vehicle.

The second acquisition assembly 502 is configured to acquire the load of the vehicle according to the deformation data.

In one implementation mode, the first acquisition assembly 501 is specifically configured to:

acquire a plurality of pieces of deformation data at a preset frequency within the preset time, and filter out interference data in the plurality of pieces of deformation data to acquire effective deformation data.

In one implementation mode, the second acquisition assembly 502 is specifically configured to:

acquire the motion state of the vehicle, and calculate the deformation data according to the corresponding motion state of the vehicle to acquire the load of the vehicle.

In one implementation mode, the second acquisition assembly 502 is also configured to:

acquire an angle change value of the wheel hub of the vehicle within preset time, and acquire the motion state of the vehicle according to the angle change value.

In one implementation mode, the second acquisition assembly 502 is also configured to:

acquire an angle change value of the wheel hub of the vehicle within preset time, and acquire the motion state of the vehicle according to the angle change value.

In one implementation mode, the second acquisition assembly 502 is also configured to:

calculate the mean value of the effective deformation data when the motion state of the vehicle is static, and acquire the load of the vehicle according to the mean value of the effective deformation data;

otherwise, calculate the true effective value of the effective deformation data through Fourier transformation, and acquire the load of the vehicle according to the true effective value of the effective deformation data.

The apparatus 500 in the embodiment of the present disclosure may be an apparatus arranged in the vehicle, or may be an independent apparatus that is in connection and communication with the vehicle.

In some embodiments, the apparatus 500 in the embodiment of the present disclosure may be configured to execute the method for dynamically acquiring the load of the vehicle in the above embodiment, and of course, may also include assemblies configured to execute any flow and/or steps in the method for dynamically acquiring the load of the vehicle in the above embodiment. For simplicity, the descriptions thereof are omitted.

The description of the above apparatus embodiment is similar to the description of the above method embodiment, and has the beneficial effects similar to the beneficial effects of the method embodiment. Technical details which are not disclosed in the apparatus embodiment of the present disclosure are understood by referring to the description of the method embodiment of the present disclosure.

The various assemblies included in the embodiment of the present disclosure may be implemented through a processor in the vehicle, and of course, may also be implemented through a logic circuit in the vehicle. During the implementation, the processor may be a central processing unit (CPU), a micro processing unit (MPU), a digital signal processor (DSP) or a field programmable gate array (FPGA) and the like.

Third Embodiment

Figure 6:
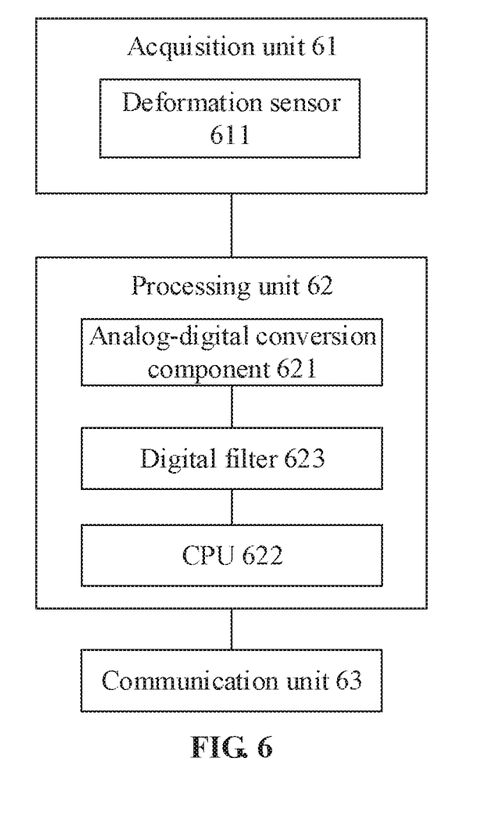
FIG. 6 is a schematic structural diagram of a device for dynamically acquiring the load of a vehicle according to the embodiment of the present disclosure.

The present embodiment provides a device for acquiring the load of a vehicle. As shown in FIG. 6, the device includes an acquisition unit 61 and a processing unit 62. The acquisition unit 61 includes a deformation sensor 611. The processing unit 62 is a micro control unit (MCU).

The acquisition assembly 61 is configured to acquire deformation data of load-bearing deformation of a wheel hub of the vehicle.

The processing unit 62 is configured to process the deformation data to acquire the load of the vehicle.

The acquisition unit 61 and the processing unit 62 are mutually connected.

Specifically, the processing unit 62 includes an analog-digital conversion component 621 and a central processing unit (CPU) 622. The input end of the analog-digital conversion component 621 is connected with the acquisition unit 61, and the output end of the analog-digital conversion component 621 is connected with the CPU 622.

The analog-digital conversion component 621 is configured to convert an analog signal acquired by the deformation sensor 611 into a digital signal.

More specifically, the processing unit 62 also includes a digital filter 623. The input end of the digital filter 623 is connected with the analog-digital conversion component 621, and the output end of the digital filter 623 is connected with the CPU 622. The digital filter 623 is an apparatus for performing certain operation on a group of input digital sequences to convert the input digital sequences into another group of output digital sequences. It is assumed that an input of the digital filter 623 is X(n), and an output is Y(n), so that a relation between the input sequences and the output sequences may be expressed by a difference equation:

$$y(n) = \sum_{k=0}^{M} a_k x(n-k) - \sum_{k=1}^{N} b_k y(n-k) \qquad (1)$$

Parameters $a_K$ and $b_K$ are different, so that low-pass, high-pass, band-pass and band stop digital filters 623, and other digital filters 623 may be realized. In the present disclosure, low-pass filtering is designed. In this way, power-frequency or high-frequency interference may be filtered out, and effective data is screened out. The selection of the parameters $a_K$ and $b_K$ is determined according to calibration of the deformation sensor and actual test values.

Further, the device further includes a communication unit 63. The communication unit 63 is configured to transmit the acquired load of the vehicle to the outside, such as to a display screen of a center console of the vehicle. The communication unit 63 includes one or more of an RF device and a ZigBee device. That is, the transmission principle is RF or ZigBee.

Fourth Embodiment

Figure 7:
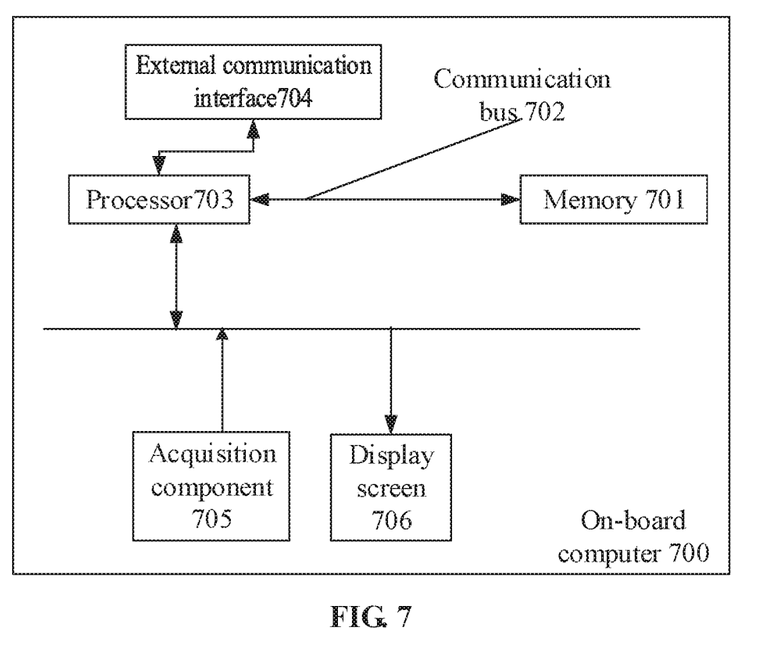
FIG. 7 is a structural schematic diagram of an on-board computer in an embodiment of the present disclosure.

The present embodiment provides an on-board computer. As shown in FIG. 7, the on-board computer 700 includes: a memory 701, a communication bus 702 and a processor 703.

The memory 701 is configured to store programs of a method for dynamically acquiring the load of a vehicle, and acquired deformation data.

The communication bus 702 is configured to realize connection and communication between the memory and the processor.

The processor 703 is configured to execute the programs of the method for dynamically acquiring the load of the vehicle, which is stored in the memory, so as to implement the steps of the method as described in the first embodiment.

Specifically, the processor 703 may be a multi-core processor based on a reduced instruction set computer (RISC). The memory 701 may be a high-capacity magnetic memory.

Specifically, the on-board computer 600 further includes: an external communication interface 704, an acquisition component 705 and a display screen 706.

The external communication interface 704 may be configured to communicate with the outside. An external terminal includes a server or a client. The external communication interface 704 includes a wired interface and a wireless interface.

The acquisition component 705 may be configured to acquire deformation data of load-bearing deformation of a wheel hub of a vehicle.

The display screen 706 may be configured to display the acquired load of the vehicle.

The description of the above on-board computer embodiment is similar to the description of the above method embodiment, and has the beneficial effects similar to the beneficial effects of the method embodiment. Technical details which are not disclosed in the on-board computer embodiment of the present disclosure are understood by referring to the description of the method embodiment of the present disclosure.

Fifth Embodiment

The embodiment of the present disclosure provides a computer readable storage medium storing an executable program. The executable program implements the steps of the method for dynamically acquiring the load of the vehicle as described in the first embodiment when executed by a processor.

The computer readable storage medium may be a high-capacity magnetic memory.

The description of the above computer readable storage medium embodiment is similar to the description of the above method embodiment, and has the beneficial effects similar to the beneficial effects of the method embodiment. Technical details which are not disclosed in the computer readable storage medium embodiment of the present disclosure are understood by referring to the description of the method embodiment of the present disclosure.

Sixth Embodiment

The present embodiment further provides a wheel assembly of a vehicle. The wheel assembly includes a wheel hub, a tire and the device for dynamically acquiring the load of the vehicle in the third embodiment. The deformation sensor in the device is mounted at the outer circumferential surface of a rim of the wheel hub. The tire is mounted on the wheel hub, and covers the deformation sensor.

For the convenience of detection here, the deformation sensor is mounted on the wheel hub, and other components in the device for dynamically acquiring the load of the vehicle may be mounted on the wheel hub, or may be independent of the wheel hub and mounted on other portions of the vehicle.

Further, the wheel assembly here may only include one portion in the device for dynamically acquiring the load of the vehicle. Since the data may be wirelessly transmitted, or may be connected in a non-rigid connection manner, such as, through a flexible lead, the processing unit and the wheel assembly may be separately mounted.

Seventh Embodiment

The present embodiment further provides an automobile. The automobile includes a trip computer, a center console and the wheel assembly in the sixth embodiment. The device for measuring the load of the wheel hub of the vehicle in the wheel assembly is connected with the trip computer, and is connected with the center console.

In order to support the device for dynamically acquiring the load of the vehicle in the third embodiment, the trip computer may be a trip computer in a conventional vehicle, or may be a particularly set trip computer, or may be a computer independent of the trip computer of the vehicle, so that the trip computer here should not be understood by its name, but should be understood as a computer device of a device that supports dynamically monitoring the working state of the vehicle.

The center console here may receive corresponding information of the load of the wheel hub of the vehicle through a user screen. The information also includes alarm information.

It should be noted that terms "include", "including" or any other variants thereof herein are meant to cover non-exclusive inclusions, so that a process, method, object or device that includes a series of elements not only includes those elements, but also includes other elements which are not definitely listed, or further includes inherent elements of this process, method, object or device. Without more restrictions, elements defined by a sentence "includes a/an . . . " do not exclude that the process, method, object or device that includes the elements still includes other identical elements.

As described in the embodiments of the present disclosure, unless otherwise stated and specified, the term "connect" shall be of a general understanding. For example, it may be electrical connection, may be internal connection between two elements, may be direct connection, and also may be indirect connection through an intermediate. Those of ordinary skill in the art may understand specific meanings of the above term according to specific situations.

The term "first\second\third" as used in the embodiments of the present disclosure is only to distinguish similar objects, and does not represent a specific order of the objects. It can be understood that specific orders or an order of "first\second\third" may be interchanged where permitted.

It should be understood that "one embodiment" or "some embodiments" mentioned in the whole article of the specification means that specific features, structures or characteristics related to the embodiments are included in at least one embodiment of the present disclosure. Therefore, "in one embodiment" or "in some embodiments" appearing in throughout the whole specification does not necessarily mean the same embodiment. In addition, these specific features, structures or characteristics may be combined in one or more embodiments in any proper manner. It should be understood that in various embodiments of the present disclosure, the serial numbers of the above various processes do not mean the order of execution. The order of execution of the various processes shall be determined by their functions and an internal logic, and shall not constitute any limitations to the implementation processes of the embodiments of the present disclosure. The serial numbers of the embodiments of the present disclosure are only for description, and do not represent the quality advantages and disadvantages of the embodiments.

In the several embodiments provided by the present disclosure, it should be understood that the disclosed device and methods may be implemented in other manners. The device embodiments described above are merely illustrative. For example, the division of the assembly or unit is only a logical function division. In actual implementation, there may be another division manner. For example, a plurality of assemblies or components may be combined, or integrated into another system, or some features may be ignored or not executed. In addition, the mutual coupling or direct coupling or communication connection shown or discussed may be indirect coupling or communication connection through some interfaces, devices or assemblies, and may be in electrical, mechanical or other forms.

The above assemblies described as separate components may or may not be physically separated, and the components displayed as assemblies may or may not be physical assemblies. They may be located in one place or distributed to multiple network assemblies. Some or all of the assemblies may be selected according to actual needs to achieve the objective of the solution of the present embodiment.

In addition, functional assemblies in all embodiments of the present disclosure may be integrated into one processing assembly, or the functional assembly may be used as independent assemblies, or two or more functional assemblies may be integrated into one assembly. The above integrated assemblies may be implemented in the form of hardware, or in the form of hardware and software functional assemblies.

Those of ordinary skill in the art may understand that: all or part of the steps of the foregoing method embodiment may be implemented by program instruction related hardware. The foregoing program may be stored in a computer readable storage medium. The steps of the above method embodiment are executed when the program is executed. The foregoing storage medium includes: various types of media that store program codes, such as a mobile storage device, a read only memory (ROM), a random access memory (RAM), a magnetic disk or an optical disk.

Or, the foregoing integrated assembly, if implemented in the form of a software functional assembly and sold or used as a standalone product, may be stored in a computer readable storage medium. Based on such understanding, the technical solutions of the embodiments of the present disclosure or parts that make contribution to the prior art may be embodied in the form of a software product, and the computer software product is stored in a storage medium, including a plurality of instructions configured to cause a computer device (which may be a personal computer, a server or a network device) to execute all or part of the methods of the various embodiments of the present disclosure. The foregoing storage media include: various media that may store program codes, such as the mobile storage device, the ROM, the RAM, the magnetic disk or the optical disk. Therefore, the embodiments of the present disclosure are not limited to any particular hardware and software combinations.

The above is only the preferred embodiments of the present disclosure, and is not intended to limit the protection scope of the present disclosure. Any modifications, equivalent replacements and improvements that are made within the spirit and principle of the present disclosure shall fall within the protection scope of the present disclosure.

The invention claimed is:

1. A method for dynamically acquiring a load of a vehicle, comprising:
acquiring deformation data of load-bearing deformation of a wheel hub of the vehicle; and
acquiring the load of the vehicle according to the deformation data,
wherein the step of acquiring the load of the vehicle according to the deformation data comprises:
acquiring a motion state of the vehicle; and
calculating the deformation data according to the motion state of the vehicle to acquire the load of the vehicle; and
wherein the step of acquiring the motion state of the vehicle comprises:
acquiring an angle change value of the wheel hub of the vehicle within a preset time; and
acquiring the motion state of the vehicle according to the angle change value.

2. The method according to claim 1, wherein the step of acquiring the motion state of the vehicle according to the angle change value comprises:
determining that the motion state of the vehicle is static when the angle change value is less than a preset value, otherwise determining that the motion state of the vehicle is running.

3. The method according to claim 2, wherein the step of acquiring the deformation data of the load-bearing deformation of the wheel hub of the vehicle comprises:
acquiring a plurality of pieces of deformation data at a preset frequency within the preset time; and
filtering out interference data in the plurality of pieces of deformation data to acquire effective deformation data.

4. The method according to claim 3, wherein the step of calculating the deformation data according to the motion state of the vehicle to acquire the load of the vehicle comprises:
calculating a mean value of the effective deformation data when the motion state of the vehicle is static, and acquiring the load of the vehicle according to the mean value of the effective deformation data;
otherwise, calculating a true effective value of the effective deformation data through Fourier transformation, and acquiring the load of the vehicle according to the true effective value of the effective deformation data.

5. An apparatus for dynamically acquiring a load of a vehicle, comprising a memory, a communication bus and a processor, wherein the memory is configured to store programs of a method for dynamically acquiring the load of the vehicle, and acquired deformation data;

the communication bus is configured to realize connection and communication between the memory and the processor; and the processor is configured to execute the programs of the method for dynamically acquiring the load of the vehicle, which is stored in the memory, so as to:

acquire deformation data of load-bearing deformation of a wheel hub of the vehicle; and acquire the load of the vehicle according to the deformation data, wherein the step of acquiring the load of the vehicle according to the deformation data comprises:
acquiring a motion state of the vehicle; and
calculating the deformation data according to the motion state of the vehicle to acquire the load of the vehicle; and wherein the step of acquiring the motion state of the vehicle comprises:
acquiring an angle change value of the wheel hub of the vehicle within a preset time; and
acquiring the motion state of the vehicle according to the angle change value.

6. A non-transitory computer readable storage medium, wherein the non-transitory computer readable storage medium stores an executable program; and the executable program is executed by a processor to implement a method for dynamically acquiring a load of a vehicle, comprising:
acquiring deformation data of load-bearing deformation of a wheel hub of the vehicle; and
acquiring the load of the vehicle according to the deformation data,
wherein the step of acquiring the load of the vehicle according to the deformation data comprises:
acquiring a motion state of the vehicle; and
calculating the deformation data according to the motion state of the vehicle to acquire the load of the vehicle; and
wherein the step of acquiring the motion state of the vehicle comprises:
acquiring an angle change value of the wheel hub of the vehicle within a preset time; and
acquiring the motion state of the vehicle according to the angle change value.

* * * * *